(12) United States Patent
Schiehlen

(10) Patent No.: US 7,668,372 B2
(45) Date of Patent: Feb. 23, 2010

(54) METHOD AND SYSTEM FOR COLLECTING DATA FROM A PLURALITY OF MACHINE READABLE DOCUMENTS

(75) Inventor: Matthias Schiehlen, Constance (DE)

(73) Assignee: Open Text Corporation, Bellevue, WA (US)

( * ) Notice: Subject to any disclaimer, the term of this patent is extended or adjusted under 35 U.S.C. 154(b) by 357 days.

(21) Appl. No.: 10/571,239

(22) PCT Filed: Aug. 26, 2004

(86) PCT No.: PCT/EP2004/009538

§ 371 (c)(1),
(2), (4) Date: Nov. 10, 2006

(87) PCT Pub. No.: WO2005/029392

PCT Pub. Date: Mar. 31, 2005

(65) Prior Publication Data

US 2007/0065011 A1    Mar. 22, 2007

(30) Foreign Application Priority Data

Sep. 15, 2003    (DE) ................. 103 42 594

(51) Int. Cl.
G06K 9/34    (2006.01)
(52) U.S. Cl. ................... 382/176; 382/175; 382/173
(58) Field of Classification Search ........... 382/181, 382/161, 209, 175, 173, 157, 187, 240, 100, 382/228, 176; 706/12; 707/100, 10, 104.1; 709/203; 715/250, 505; 358/403
See application file for complete search history.

(56) References Cited

U.S. PATENT DOCUMENTS 3,611,291 A    10/1971    Frank (Continued)

FOREIGN PATENT DOCUMENTS

DE    10342594    4/2005

(Continued)

OTHER PUBLICATIONS

IBM Systems Journal 29 (1990) No. 3, Armonk, NY US Intelligent Forms Processing Casey et al.

(Continued)

*Primary Examiner*—Anh Hong Do
(74) *Attorney, Agent, or Firm*—Perkins Coie LLP

(57) ABSTRACT

In a method and system for collection of data from documents present in machine-readable form, at least one already-processed document stored as a template and designated as a template document is associated with a document to be processed designated as a read document. Fields for data to be extracted are defined in the template document. Data contained in the read document are already extracted from regions that correspond to the fields in the template document. Should an error have occurred or no suitable template document having been associated given the automatic extraction of the data, the read document is shown on a screen and fields are manually inputted in the read document from which the data are extracted. After the manual input of the fields in the read document, the read document with field specifications is stored as a new template document or the previous template document is corrected corresponding to the newly input fields.

20 Claims, 6 Drawing Sheets

U.S. PATENT DOCUMENTS

| | | | |
|---|---|---|---|
| 3,925,760 A | 12/1975 | Mason et al. | |
| 4,272,756 A | 6/1981 | Kakumoto et al. | |
| 4,933,979 A | 6/1990 | Suzuki et al. | 382/173 |
| 5,140,650 A | 8/1992 | Casey et al. | 382/283 |
| 5,317,646 A | 5/1994 | Sang, Jr. et al. | |
| 5,448,375 A * | 9/1995 | Cooper et al. | 358/403 |
| 5,594,809 A * | 1/1997 | Kopec et al. | 382/161 |
| 5,666,549 A | 9/1997 | Tsuchiya et al. | |
| 5,680,223 A * | 10/1997 | Cooper et al. | 358/403 |
| 5,689,620 A * | 11/1997 | Kopec et al. | 706/12 |
| 5,835,712 A * | 11/1998 | DuFresne | 709/203 |
| 5,923,792 A | 7/1999 | Shyu et al. | |
| 5,963,966 A | 10/1999 | Mitchell et al. | |
| 5,966,473 A | 10/1999 | Takahashi et al. | |
| 6,028,970 A | 2/2000 | DiPiazza et al. | 382/309 |
| 6,131,102 A | 10/2000 | Potter | |
| 6,353,840 B2 | 3/2002 | Saito et al. | |
| 2002/0034328 A1 | 3/2002 | Naoi et al. | |
| 2002/0141660 A1 | 10/2002 | Bellavita et al. | |
| 2003/0115189 A1 | 6/2003 | Srinivasa et al. | |
| 2004/0243552 A1 | 12/2004 | Titemore et al. | |
| 2007/0201768 A1 | 8/2007 | Schiehlen | |
| 2008/0195968 A1 | 8/2008 | Schacht | |

FOREIGN PATENT DOCUMENTS

| | | |
|---|---|---|
| EP | 1510962 | 3/2005 |
| JP | 09062758 | 3/1997 |
| WO | WO 98/47098 | 10/1998 |
| WO | WO-2005/043452 | 5/2005 |
| WO | WO-2007/006687 | 1/2007 |

OTHER PUBLICATIONS

Indexing and Searching—pp. 192-219, 2003.

International Search Report and Written Opinion; International Application No. PCT/EP2004/009539; Mailed Mar. 31, 2005; 2 pages.

International Search Report and Written Opinion; International Application No. PCT/EP2004/009538; Mailed Jan. 25, 2005; 3 pages.

Oce Document Technologies—XP-002399738—Feb. 18, 2005.

Oce Document Technologies XP-002399736 DOKuStar Produktfamilie—2004.

XP-002399735—"Single Click Entry" das neue Tool von Oce Document Technologies macht Nachbearbeitung von Dokumenten noch schneller—2004.

XP-002399747 Single Click Entry Oder Wie Die Maus in Der Datenerfassung Salonfiihig Wird—Version 1.2—Jan. 2005.

* cited by examiner

METHOD AND SYSTEM FOR COLLECTING DATA FROM A PLURALITY OF MACHINE READABLE DOCUMENTS

CROSS-REFERENCE TO RELATED APPLICATION(S)

This application is a U.S. National Phase of International Application No. PCT/EP2004/009538 filed on Aug. 26, 2004, entitled METHOD AND SYSTEM FOR COLLECTING DATA FROM A PLURALITY OF MACHINE READABLE DOCUMENTS, which application is hereby incorporated by reference in its entirety.

BACKGROUND

The preferred embodiment concerns a method and system for collection of data from a plurality of machine-readable documents.

Such methods and systems are known. The systems typically comprise a scanner with which originals are optically scanned. The files hereby generated are machine-readable documents and as a rule contain text elements. The text elements are converted into encoded text with the aid of an OCR device. As a rule, predetermined forms or, respectively, templates are associated with the files such that targeted, specific information from the files containing the text can be determined using the forms. This information is, for example, stored in a databank.

Such methods and systems are, for example, used in large companies in order to read bills. The data so extracted can automatically be transferred to a business management software.

Such a system is, for example, described in U.S. Pat. No. 4,933,979. This system comprises a scanner for optical scanning of forms. A plurality of form types can be defined in this system, whereby each form type or template is established via a plurality of parameters, in particular geometrically defined regions in which text or images should be contained. The form types or templates can also be defined by further properties such as, for example, the writing that is contained in the texts (alphabet, numbers, symbols, katakana, kanji, handwriting). After the scanning of a form, a template is associated with the scanned form by means of a form type differentiation device. The data contained in the text field are correspondingly read and extracted by means of an OCR device. In the event that no suitable template is present, one must be created. This is complicated. Personnel are required for this who must be specially trained for this system and must have at least basic knowledge of the computer and software technology.

A further system for automatic collection of data from machine-readable documents arises from WO 98/47098. Forms are here optically scanned by means of a scanner. A line chart of the form is subsequently automatically generated. On the one hand, all lines and all graphical elements are converted into a line structure. Other elements such as, for example, text segments are filtered out. All vertical lines form the foundation for creation of a vertical key, and all horizontal lines form the foundation for creation of a horizontal key. It is subsequently determined whether a template with a corresponding vertical and horizontal key is already present. In the event that this is the case, the data are read out with a corresponding template. If this is not the case, a template is created and stored using the scanned form by means of a self-learning mode. The user can manually support the creation of the template. Here as well, the user should possess good knowledge of this system in the template creation, in particular its software structure, so that suitable templates are created for the operation.

The foundations of databanks and for fast retrieval of information stored in databanks is explained in the book Modern Information Retrieval by Baeza-Yates and Ribeiro-Neto, Eddison-Wessley Publishing, ISBN 0-201-39829-X. A method with inverted files (which is also designated as an inverted index) is thus described in chapter 8.2. In this method, a dictionary with all words contained in the text is initially created from a text to be examined. One or more numbers that specify at which point the word occurs in the text are associated with all words of the dictionary. Such inverted files allow a faster, automatic analysis of a text to be searched. A string matching method is described in chapter 8.6.1 with which two strings are compared and a cost measure indirectly proportional to the similarity of the strings is calculated. When the two strings are identical, the value of the cost measure is zero. The cost measure is thus an expression for the similarity of the two strings. This and similar methods are also known under the designations approximate string matching, Levenshtein method, elastic matching and Viterbi algorithm. These methods belong to the field of dynamic programming.

A method for extraction of data fields from scanned documents arises from CASEY R. G. et al.: "Intelligent Forms Processing", IBM Systems Journal, IBM Corp., USA, Volume 29, Nr. 3, January 1990, pages 435 to 450, XP000265375, ISSN: 0018-8670. This method is characterized in that background lines and the like can be extracted. Before forms can be processed with this method, models must be generated for each form type. Such a model of a form type is comprised of form patterns and a description for each field that is contained in the form. A form pattern is a set of features that are used for differentiation of one form type from another form type. The field descriptions comprise the location of the field in the form. Different methods of how the forms can be detected are disclosed here. In the event that a form is detected, information is also generated that specifies to what extent the position coincides between the form model and the detected form, whereby corresponding deviations can thereby be corrected.

A system for detection of forms arises from Patent Abstract of Japan Volume 1997, Nr. 07, 31st Jul. 1997 (JP 9 062758 A), in which system forms that are not completely detected are directly stored in an image file. These forms that are stored as an image file and not detectable can then be manually processed "en bloc".

U.S. Pat. No. 5,140,650 A discloses a method and a system for optical recognition of letters (OCR device) in which an empty blank master form is scanned first and the corresponding digital image is stored. This scanned image is used in order to generate a template so that later corresponding forms can be automatically read and extracted.

A device for automatic reading of data from forms arises from U.S. Pat. No. 4,933,979 that comprises a scanning device for optical scanning of the forms for output of image data as well as a storage device for storage of information. A reader is also provided with which the regions of the forms are read out from the image data dependent on form information of a model form. The information of the model form are generated via scanning of a model form, whereby the digital image is shown on a screen on which a user can establish the read conditions for each read region. This registration process of the form information is executed for each form type that should then be read later.

A template recognition system that supports the operator in the creation of electronic templates arises from U.S. Pat. No. 5,317,646. The method enables the operator to consider what is known as a master form or blank form on a screen that comprises framed or semi-framed regions that show fields. The operator can then select via selection of an individual point within this framed or semi-framed region by means of a pointer device, and the coordinates representing the framed region are automatically determined by means of the single point selected by the operator.

SUMMARY

It is an object to achieve a method and a system for collection of data from machine-readable documents that can be operated very simply and without knowledge of the computer and software technology.

In a method and system for collection of data from documents present in machine-readable form, at least one already-processed document stored as a template and designated as a template document is associated with a document to be processed designated as a read document. Fields for data to be extracted are defined in the template document. Data contained in the read document are already extracted from regions that correspond to the fields in the template document. Should an error have occurred or no suitable template document having been associated given the automatic extraction of the data, the read document is shown on a screen and fields are manually inputted in the read document from which the data are extracted. After the manual input of the fields in the read document, the read document with field specifications is stored as a new template document or the previous template document is corrected corresponding to the newly input fields.

DESCRIPTION OF THE PREFERRED EMBODIMENT

Figure 1:
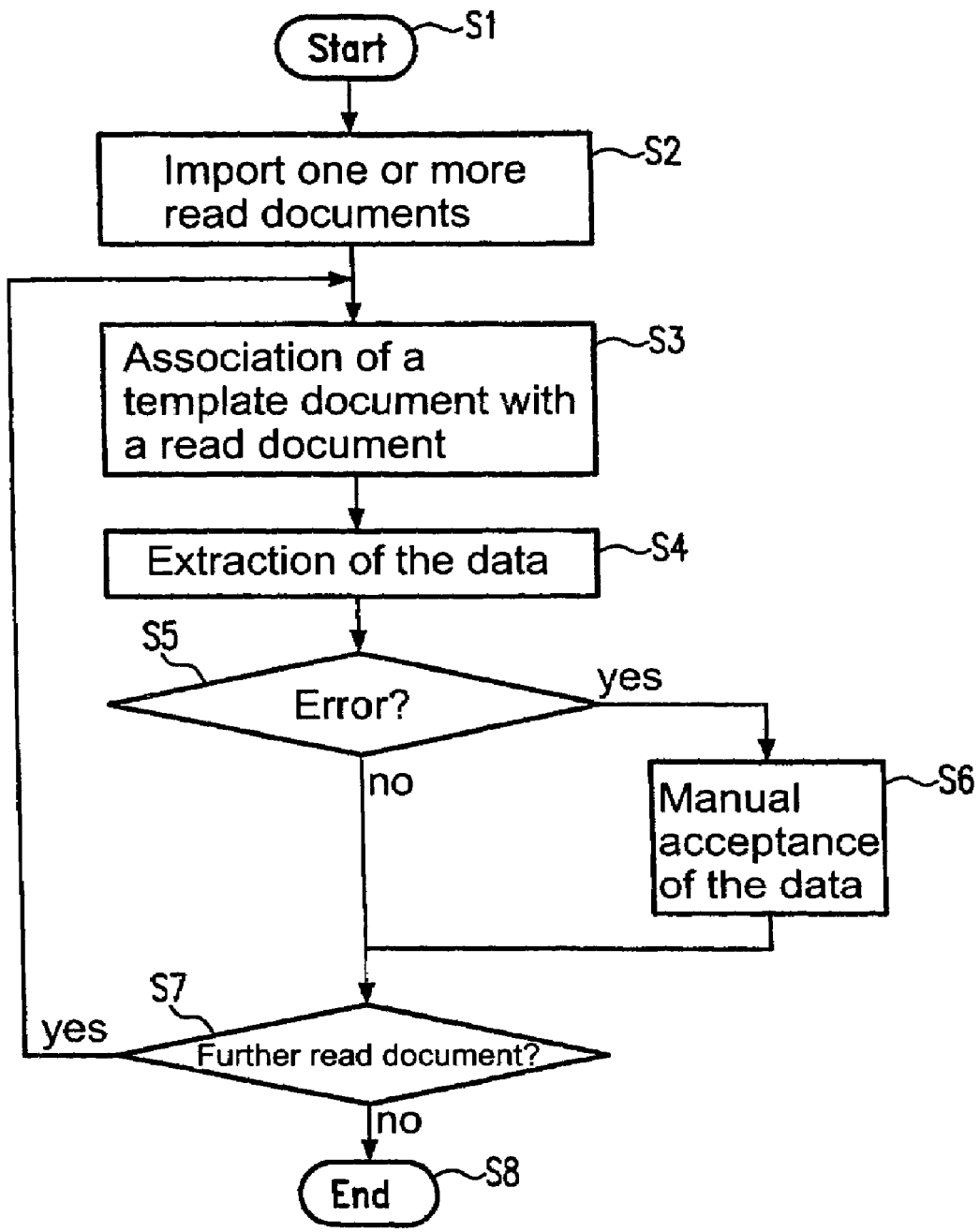
FIG. 1 shows basic structures of the method of the preferred embodiment in a flow diagram.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

The method of the preferred embodiment for collection of data from a plurality of machine-readable documents comprises the following steps:

association of at least one already processed document that is stored as a template (and is subsequently designated as a template document) with a document to be processed (that is subsequently designated as a read document), whereby fields for the data to be extracted are defined in the template document, automatic extraction of the data contained in the read document from the regions that correspond to the fields in the template document, should an error have occurred or no suitable template document have been associated given the automatic extraction of the data, the read document is shown on a screen and a unit is provided for manual input of fields in the read document from which the data are extracted.

In the event that a read document cannot be automatically extracted, in the method of the preferred embodiment only the fields from which the data should be collected are to be input in said read document, without further inputs that require computer and software knowledge being required of the user.

This is enabled in that an essentially unchanged read document is respectively stored as a template document, to which read document only specifications (such as the definitions of the fields) are to be added.

The preferred embodiment differs relative to conventional methods in that, in the determination of the similarity of the read documents, specially-derived parameters (such as, for example, line keys or the like) that must be specially created are not compared with a template document; rather, the template documents contain the original read documents essentially unchanged, whereby only additional information is added.

The basic structure of the of the preferred embodiment method is schematically represented in the flow diagram shown in FIG. 1.

The method begins with step S1. One or more machine-readable documents are read in step S2. The reading of the documents can, for example, occur by means of a scanner. However, the documents can also be documents already present in machine-readable form, such as (for example) e-mails, files containing text, or documents stored in a databank. A machine-readable document is any document readable by a computer. The documents can be respectively stored in a separate file. However, it is also possible that a plurality of documents are combined in a single file. The documents can in particular be contained in a databank. The documents can be stored as a graphic file. The documents can also exist as a text file or contain combinations of graphic and text elements. If the documents contain text sections that are stored as a graphic, the documents are converted into encoded text with an OCR method in step S2. Such methods are sufficiently known and do not need to be explained.

In the preferred embodiment of the invention, the read document or read documents are examined for syntax and semantic contents in the step S2. For example, date specifications, currency amounts, capacity amounts or other regular expressions can be established as syntactic contents. For example, designations of articles or services are recognized as semantic contents.

The method of the preferred embodiment can be used for, among other things, reading of bills and automatic extraction of the data contained therein, whereby the extracted data are passed to a business management software. Given such an application of the method of the preferred embodiment, upon reading of one of more documents that are designated as read documents it is particularly appropriate to identify syntactic contents such as amount fields or date fields and semantic contents such as the designation of the article or, respectively, service.

A template document is then associated with a read document to be processed (step S3). A template document is a processed read document already processed earlier, in which processed read document fields are contained from which data are to be extracted.

The read document and the template document possess a similar structure or a similar format, meaning that similar data are arranged at the same points in the documents. As a rule, the read and template documents associated with one another are the same forms. In step S4, data are extracted from the read document at the points at which corresponding fields are arranged in the template document. These extracted data can, for example, be entered into a databank and/or be processed by a further software.

In step S5 it is checked whether an error has occurred upon extraction of the data. An error can be caused in that no template document could be associated or an unsuitable template document has been associated with the read document. An unsuitable template document is, for example, a document whose fields do not correlate with the points of the read document at which data are contained in the read document. An error can also be caused in that an incorrect specification is contained in the imported read document, for example letters are arranged at the point where the data should be situated. Such an error can also arise upon importation of the read document by means of an OCR method, in that one or more characters are incorrectly converted.

Figure 3:
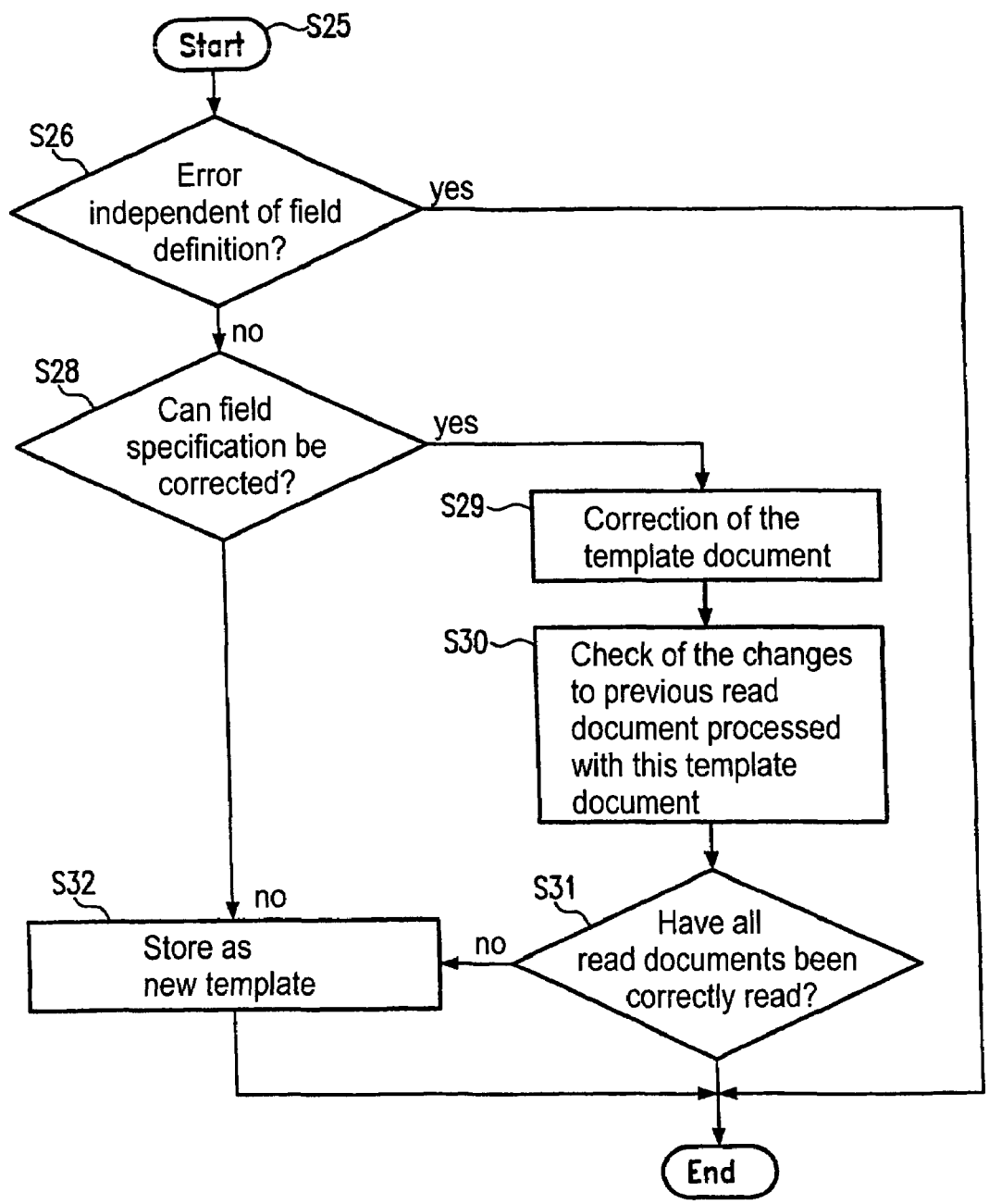
FIG. 3 is a segment of the method of the preferred embodiment for automatic creation of a new template document.
Figure 4:
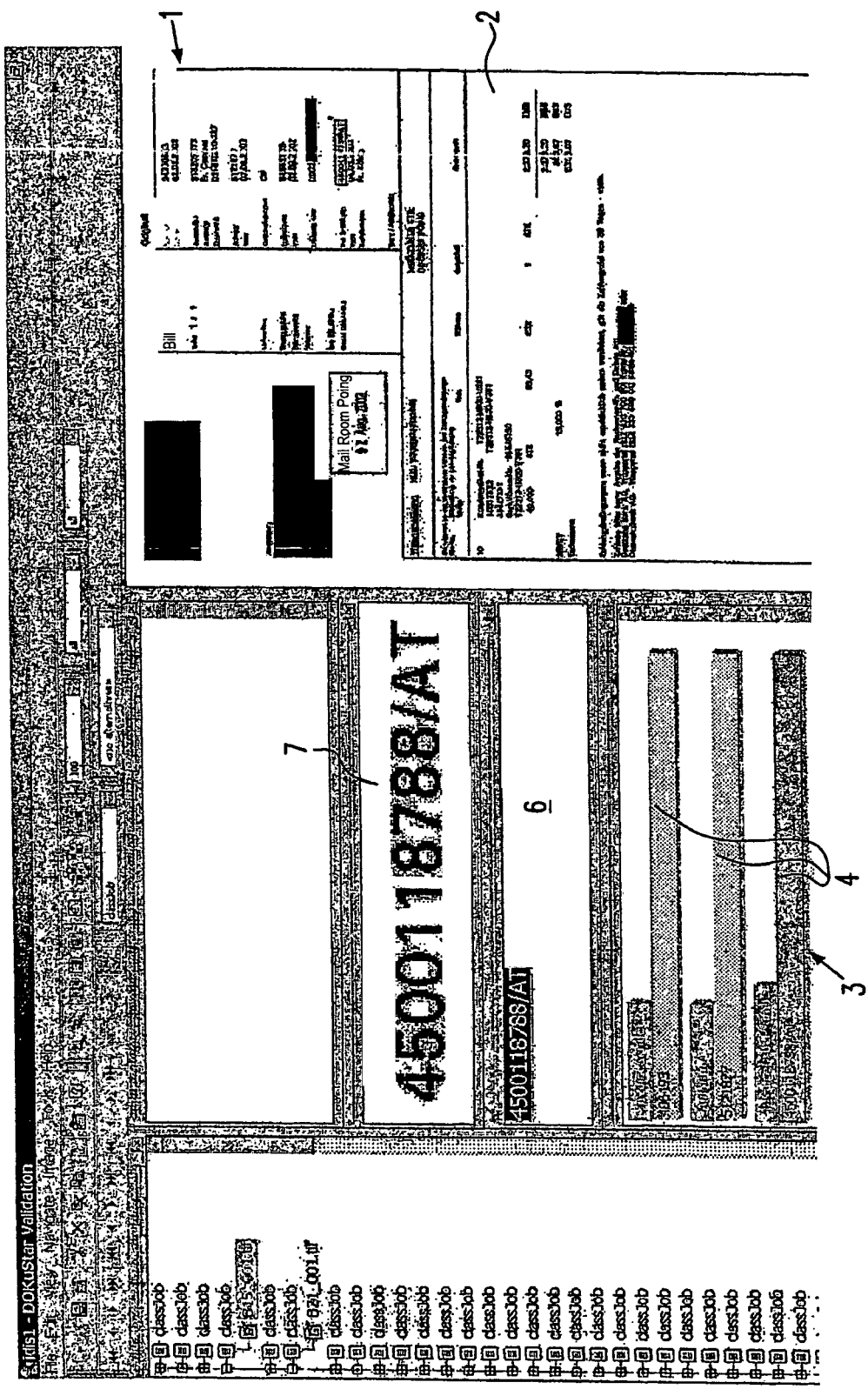
FIG. 4 is a copy of the screen interface for manual input of a field.

In the event that an error is established in step S5, the read document is displayed on a screen and structure is provided for manual input of fields in the read document. Such a screen interface is shown in FIG. 3. In the window 1, the read document 2, for example a bill, is shown at the right border. A series of data units 4 that will be extracted from the read document are listed in window 3 at the bottom center. These data units 4 are the billing number of the sender ("InvoiceSender"), the invoice number ("InvNum") and the invoice billing number ("InvoiceOrdernumber"). The invoice number is hereby highlighted with a different color than the remaining data units, which means that this data unit could not be correctly read. With the mouse, the user then marks a field 5 in the read document 2 that contains the job number. After the marking of a field, the field content is then read, the decoded content of the field (which, in the present case, is "4500118788/AT") is shown in a window 6 that is arranged above the window 3 of the data units, and the non-decoded graphical representation of the field content is displayed enlarged in the window 7 arranged over that. The user can thus read the graphic of the field 5 and compare it with the decoded field content. If this is correct, the order number has been correctly decoded and this value is accepted with a further click with the mouse on the data unit 4 in the window 3. In the present exemplary embodiment, the value is entered into a databank of a business management software. If all field contents have been extracted, it is determined with a segment of the method explained in detail below whether a new template document is created using the fields marked by the user, which is then, if applicable, implemented automatically. The described user actions can be controlled with the mouse or also completely via the keyboard.

After the manual acceptance of the data according to the step S6, or after it has been established in step S5 that no error has occurred in the extraction of the data, in step S6 it is checked whether a further read document to be processed exists. In the event that this is the case, the method workflow returns to the step S3. Otherwise the method ends with the step S8.

Figure 2:
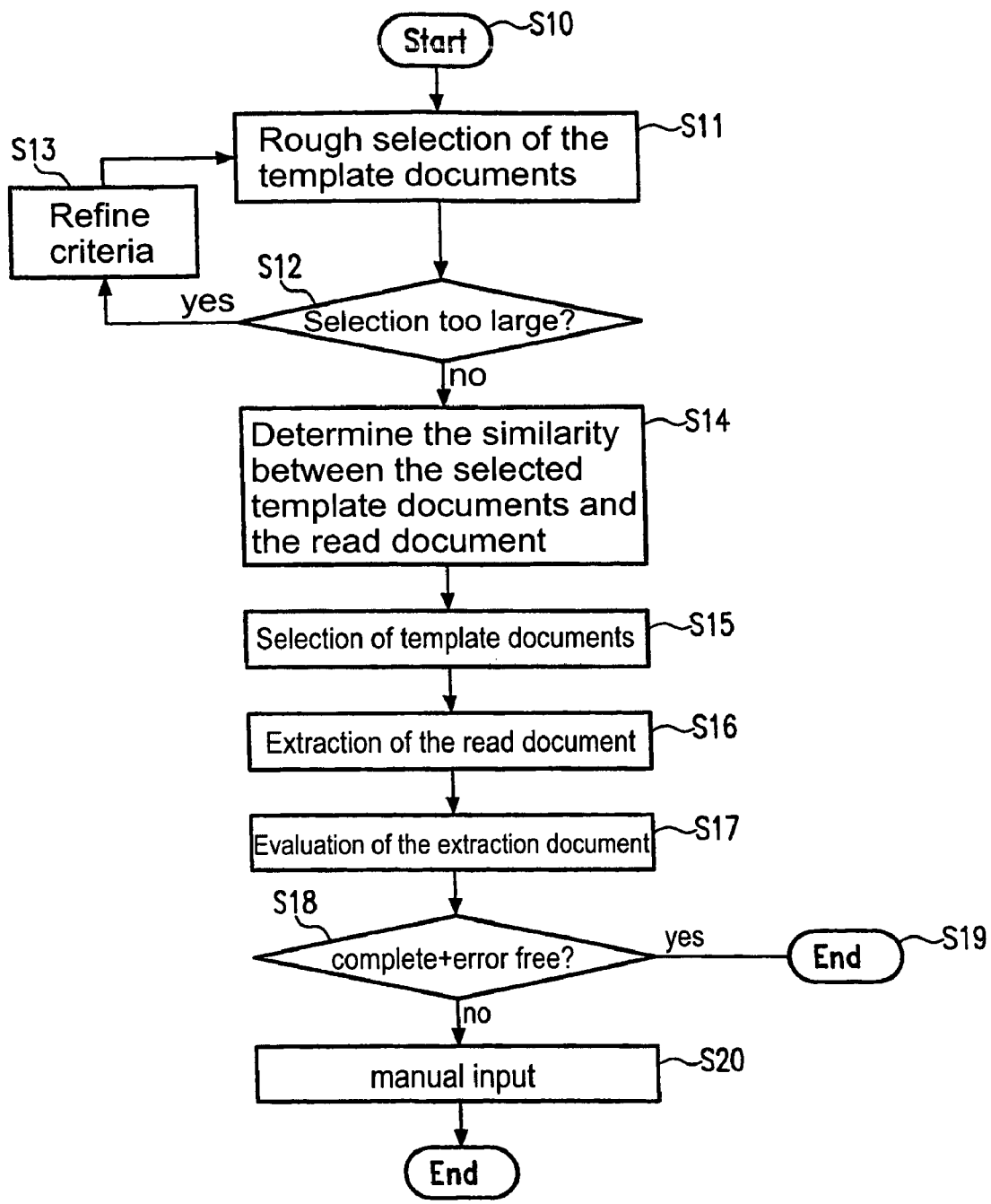
FIG. 2 is a detailed workflow of the method of the preferred embodiment for extraction of data from a read document in a flow diagram.

The section of the above method with the steps S3 through S6 is subsequently explained in detail using the preferred exemplary embodiment shown in FIGS. 2 and 3. In this exemplary embodiment, the steps of the association of a template document with a read document and the extraction of the data are interleaved with one another, as arises from the following description.

This method section begins with the step S10. A rough selection of the template document is effected in the step S11. For example, the previously explained method of the inverted files (see chapter 8.2, Inverted Files in Modern Information Retrieval, ISBN 0-201-39829-X) is used for this. A dictionary of words of all template documents, which words are selected according to a predetermined criterion, is accordingly initially created, and the numbers that designate the template documents in which the word is contained are associated with the individual words. The read document is compared with the template documents according to a predetermined criterion. This criterion can, for example, be comprised of the five largest words of the read document that are compared with the words of the template document. The template documents are then selected that also contain these five largest words of the read document. The use of the largest words is based on the realization that large words possess a high information content and often yield an unambiguous identifying mark. Instead of the largest words, for example, the five words that are situated at the beginning of the text of the read document can also be used. In forms, these five first words are as a rule contained in the letterhead, whereby the five first words are often very specific to a specific sender.

With this rough selection, the number of the template documents (which as a rule comprise some hundred thousand) is reduced to some few thousand or some hundred documents.

In step S12 it is checked whether the number of the documents determined with the rough selection is still too large. If it exceeds a threshold that, for example, lies in the range from 1000 to 10000, the method workflow passes to the step S13 in which the selection criteria are refined. Such a refinement of the selection criteria can, for example, occur via increase of the number of the words to be compared or via further criteria that are implemented in the comparison between the read document and the remaining template documents. This rough selection is thus implemented again (step S11) with the refined selection criteria, according to which it is then checked whether the number of the selected template documents is too large. If this is not the case, the method workflow passes to the step S14.

In step S14. the template documents selected in the rough selection are compared with the read document, and a cost measure describing the correlation of the two documents is calculated regarding each template document. This cost measure is designated as a similarity in the following.

This cost measure is, for example, calculated with a cost function as it is described in chapter 8.6.1, String Matching Allowing Errors in Modern Information Retrieval (ISBN 0-201-39829-X). The smaller this cost measure, the larger the similarity. In the present method, words or text line pieces separated by spaces or sequences of words of the documents to be compared are compared with the cost function, and a cost value is calculated for each two words. A mapping of the two documents which exhibit the lowest total cost to one another is determined by means of the Viterbi algorithm. The total cost represents the cost measure for both of these documents. The determined mapping, which comprises the mapping of the fields of the template document to corresponding positions of the read document, is used in an extraction (explained in detail below) in the event that this template document should be selected for extraction. Given two identical documents, the cost measure is zero. The cost measure is indirectly proportional to the similarity of the documents.

Template documents are selected in step S15 corresponding to the determined similarity. In this selection method, either template documents are selected that exceed a specific similarity value (i.e. the cost measure is smaller than a predetermined value) or a predetermined number of the most similar template documents are selected. This number can, for example, be in the range from 10 to 100 or even up to 1000.

The read document is extracted according to the selected template documents in step S16. If the number of the template documents is still very large (i.e., for example, greater than 50 or greater than 100), it can then be appropriate to not extract all fields, but rather only a portion thereof. The fields are advantageously extracted that experientially allow an error-free extraction of the data given a correct association of a template document with a read document. This is explained in further detail below.

The extraction results are subsequently evaluated in step S17. The evaluation occurs according to the string matching method described above, whereby the data read from the read document as well as their surroundings are compared with the data arising in the corresponding fields and surroundings of the template documents and the cost measure is calculated. Fields are in particular considered to be extracted well (error-free) when the surroundings on the read document and the template document correlate very well. When the field on the read document and the template document can be associated with the same concept (syntax, semantic), it is additionally assessed as being well-mappable. In the event that all fields have not been extracted in step S16, all fields are now extracted according to some few template documents and the extraction result is correspondingly evaluated. The best extraction result hereby determined forms the basis of the check in the step S18. If all fields should have been extracted in step S16, the extraction result evaluated as a best extraction result in step S17 forms the basis for the check in step S18.

In step S18 it is checked whether all data units to be read have been read, i.e. whether the extraction has been implemented completely, and whether the extraction is error-free. When this is the case, this method section is ended with the step S19 since all data have been extracted completely and error-free from the read document.

Otherwise, the method workflow passes to the step S20, in which fields are manually input into the read document in order to read the corresponding data from the read document. The step S20 corresponds to the step S6 explained above. The method is subsequently ended in step S21.

In the step S6 and the step S20 explained above, it can be that a new template document is automatically created and stored without the user gaining knowledge of this. This is executed with the method section shown in FIG. 3, which is automatically invoked upon ending the manual input of the data fields.

This method section begins with the step S25. In step S26 it is checked whether the error is independent of the field definitions contained in the template document. These are in particular all errors that are caused by data that are in fact arranged exactly at the point of the defined field but are not correct (such as, for example, letters in date specifications or in amounts or the like). These are thus all errors that result from data that are in fact correctly positioned but whose content is not correct. When it is established that the error is independent of the field definition, this means that the cause for this lies in the original read document and not in the template document. Neither a change nor an extension of the template document is thus appropriate, whereby the method workflow passes to the step S27 and is ended.

On the other hand, if it is established in step S26 that the error is not independent of the field definitions in the template files, the method workflow passes to the step S28. For example, such an error exists when the corresponding field of the template document deviates in the position at the data to be read in the read document, whereby the data are either incompletely extracted or not extracted. A similar error occurs when the field is defined too small or when the field is too large and contains further data that should not actually have been read.

In such a case, in step S6 or S20 the user has marked the data to be read via a field. In step S28 it is checked whether these new field specifications input by the user are suitable for correction of the previously-used template document. If this is the case, in step S29 the template document is correspondingly corrected and in step S30 the template document so modified is checked, in that all read documents processed and extracted with this template document are extracted.

The term correction here does not mean that the previous template documents must have been incorrect, but rather that the previously-used template document can be internally correct, however it can be suited for the mapping of its fields for further read documents via an expansion of the field specifications. The correction is thus an improvement of the template document, but not always necessarily a correction of an error.

Figure 5:
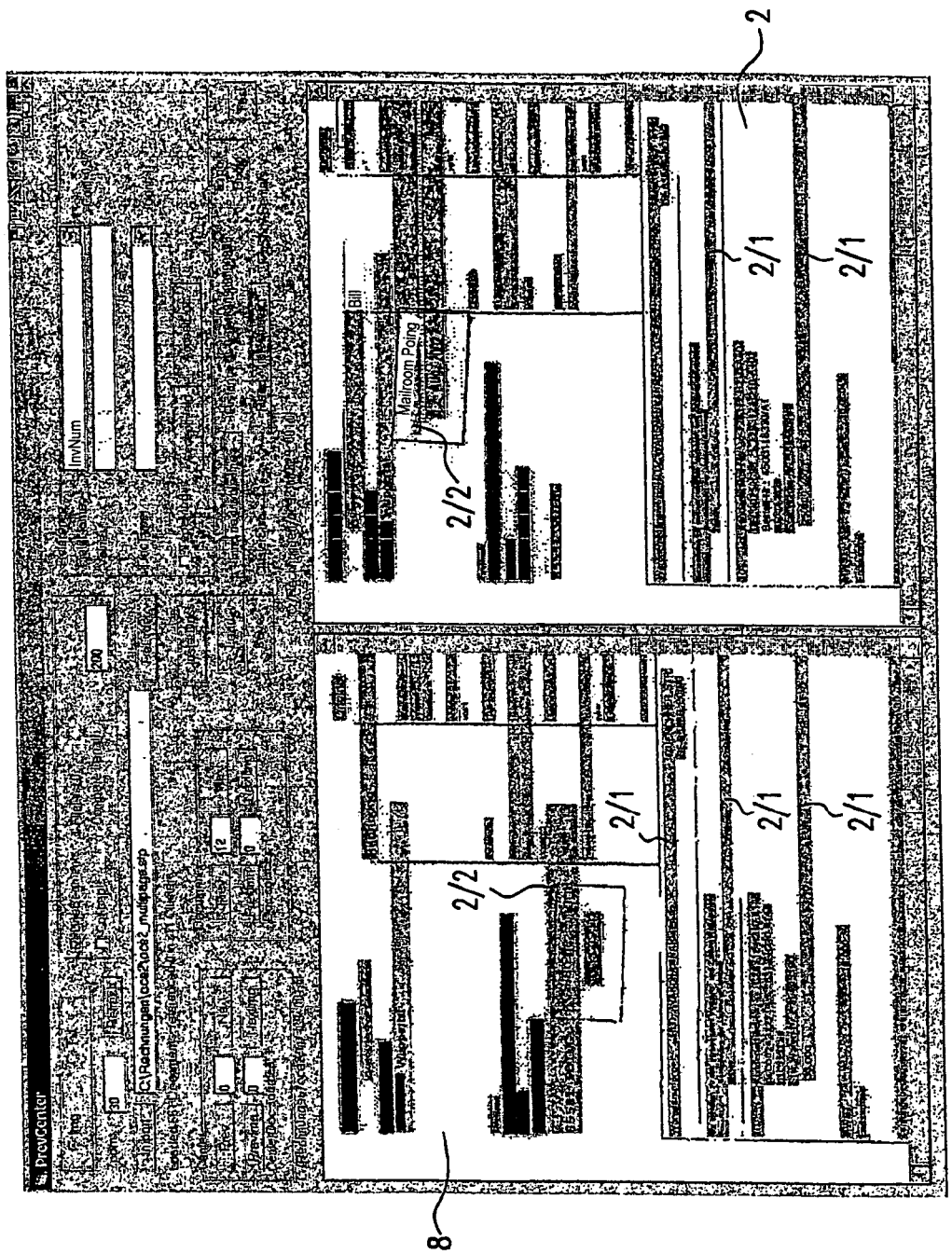
FIG. 5 shows the mapping of a read document to a template document.

In an alternative embodiment of the invention, given the correction of a template document this template document is shown on a screen and the user can manually change the errors of the template document. This is in particular advantageous when the template document and the read document are shown together on the screen (FIG. 5). The fields mapped to one another are marked in the template document 8 and in the read document 2, whereby the fields 2/1 that can be mapped well are marked with a lighter color than the fields 2/2 that can be mapped less well. For example, the receipt stamps of the documents 2, 8 are respectively detected in a field. Since the receipt stamps are arranged at different positions, they cannot be mapped to one another and disrupt the mapping of the actual data contained in these fields. The user can, for example, modify these fields such that the receipt stamps are no longer a component of the fields.

In the step S31 it is checked whether all of these documents could be correctly read with the corrected template document. If this is the case, this means that the effected correction of the template document is also suitable for reading of the previously-processed read documents and is adopted.

Given the correction of a template document in step S29, in particular surroundings of fields that are constant across a plurality of read documents are included. This means that, in the event that the surroundings of specific fields are identical in a plurality of read documents, this is noted in the template document and this information receives a particularly high importance in the assessment of the similarity of the contents of fields.

In the event that it is established in step S31 that not all read documents have been correctly read or that it is established in step S28 that the template document cannot be corrected with the manually-input field definitions, the method workflow passes to the step S32. In step S32, the read document is stored with the field definitions as a further template document. The manually-input field definitions and the definitions of the template document with which the data of this read file have been extracted are contained in this new template document.

A new template document was hereby automatically created that is considered in the evaluation of the future read documents to be processed.

The method workflow subsequently passes to the step S27, whereby this method section is ended.

The preferred embodiment was explained above using an example. However, modifications relative to this example are possible in the framework of the preferred embodiment. The step S12 and step S13 can thus be omitted, and the rough selection is implemented only once with a set of predetermined criteria. The criteria can be set differently in the steps S14 and S17. All fields can already have been read in the first pass in the step S16. In the exemplary embodiment according to FIG. 2, the association of a template document with a read document occurs via the evaluation of the extraction of the results according to the (as a rule repeated) extraction of the read document. The extraction of the data is thus used in the association. However, it is also possible to design the method such that the association of the template document with a read document occurs independent of the extraction of the data.

In a preferred embodiment of the invention, the similarities determined in the step S17 are stored and statistically evaluated. A familiarity value that describes how well data of the read documents that correspond to this field could be read is associated with each field of a template document using the statistical evaluation. If the familiarity value is high, this means that the data corresponding to this field could for the most part be read with high quality and reliability. Given the evaluation of the extraction results in step S17, the fields whose familiarity value is higher are advantageously evaluated more strictly. In the selection or association of a template document, fields that can be mapped well are hereby considered with greater significance than fields that can be mapped less well. This increases the quality of the selection method.

Furthermore, a module can be provided with which an administrator can determine (using the statistic) which template documents are seldom used for extraction of read documents or are often plagued by errors. The administrator can, if applicable, delete or process corresponding template documents. This is, for example, appropriate when a template document is created that is based on a scanned document that is very unclear and when scanned in barely legible. Such a template document can be unsuitable for further use.

In the framework of the preferred embodiment, for example in the simultaneous evaluation of the extraction results, it is also possible that the surroundings of the fields of the read documents are examined and compared with the surroundings of the fields of the template document and, in the event that an identity exists here, this is stored as an additional specification regarding the field in the template document. Fields whose surroundings are identical with many read documents are then considered with greater significance in the selection methods (described above) of the template documents than fields whose surroundings regularly change.

Figure 6:
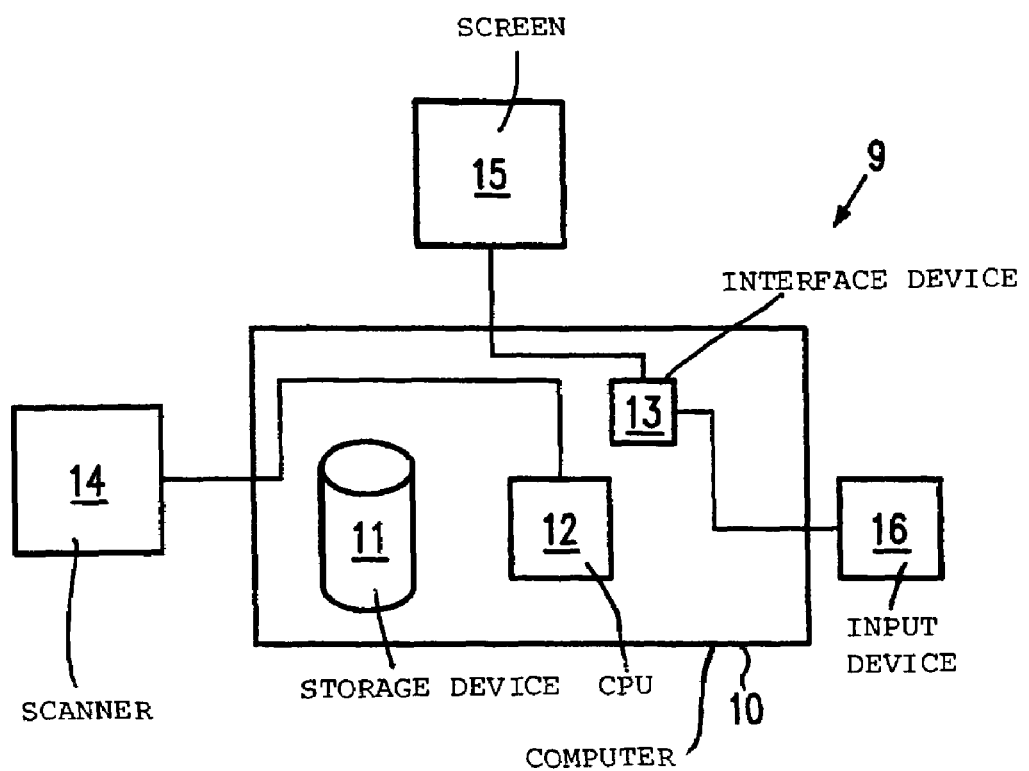
FIG. 6 illustrates schematically a system for execution of the method of the preferred embodiment in a block diagram.

FIG. 6 schematically shows a system for execution of the method of the preferred embodiment. This system 9 comprises a computer 10 with a storage device 11, with a central processing unit (CPU) 12 and an interface device 13. A scanner 14, a screen 15 and an input device 16 are connected to the computer 10. The input device 16 comprises a keyboard and/or a mouse.

A software product for execution of the method is stored in the storage device 11, which software product is executed on the CPU 12. Documents are acquired with the scanner 14 and are converted into an electronic file. These electronic files are read by the computer 10 and possibly pre-processed by means of an OCR method and/or a method for detection of special syntax or semantics in the file. The documents contained in the files are subsequently processed with the system 9 corresponding to the method described above. The corresponding inputs can be effected on the input device 16. These inputs are merely limited to the definition of a field and possibly to the linking with a data unit that is then effected by a software, for example a business management software. These inputs can be executed both on the read document and on the template document, as is described above. This is so simple that it can be executed by any person without special software or computer knowledge.

The preferred embodiment can be summarized according to the following:

The preferred embodiment concerns a method and a system for collection of data from a plurality of machine-readable documents. In the method of the preferred embodiment, data are extracted from a document (the read document) to be processed, in that the data are read out from the read document at positions that are determined by fields entered into a template document.

If an error occurs in the readout of the read documents, the read document is shown on a screen and the data can be readout merely via marking of corresponding fields in the read document. No further knowledge is required for operation of the system of the preferred embodiment.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for collection of data from documents present in machine-readable form, the method performed by a computer system with a processor and memory, the method comprising the steps of:

associating at least one already-processed document stored as a template and subsequently designated as a template document with a document to be processed that is designated as a read document, fields for data to be extracted being defined in the template document, wherein associating the at least one already-processed document with the document to be processed is performed by the processor executing instructions stored in the memory;

automatically extracting data from the read document, the data contained in regions of the read document that correspond to the fields in the template document, wherein automatically extracting data is performed by the processor executing instructions stored in the memory; and if an error occurs, or if no suitable template document is associated:

showing the read document on a screen and manually inputting fields in the read document from which the data are extracted; and storing the read document with field specifications as a new template document, or correcting the at least one already-processed template document corresponding to the newly input fields.

2. A method according to claim 1 wherein after the manual input it is checked whether the previous field specifications contained in the template document can be corrected according to the manually input field specifications, and if this is the case a corresponding correction of the template document is executed; the changes to the template document are then checked using the previously-processed read documents; and in the event that said check yields that not all previously processed read documents can be correctly read with the changes, the corrections are discarded and the read document with the manually input field specifications is stored as a new template document; and the read document with the manual field specifications is also stored as a template document when the contained field specifications of the previously used template document cannot be automatically corrected.

3. A method according to claim 1 wherein given the manual input of the fields, these are linked with a databank in which the extracted data are stored.

4. A method according to claim 3 wherein the linking occurs via input of a field in the read document and subsequent actuation of an element of the databank.

5. A method according to claim 1 wherein syntax or semantics of individual fields is evaluated upon association of a template document with a read document, and the association is executed dependent on said evaluation.

6. A method according to claim 1 wherein a plurality of read documents are evaluated as to whether surroundings are constant with regard to a field in the template document, and when this is the case this is stored and considered as a further criterion in mapping of a field of the template document to the read document.

7. A method according to claim 6 wherein in the association of the template document with the read document, a statistical evaluation is executed that associates a familiarity value with each field of the template document; said familiarity value describing how well data of the read documents corresponding to said field could be read; and given the evaluation of the associability of the template document with the read document the fields with a high familiarity value are rated higher than the fields with a lower familiarity value.

8. A method according to claim 1 wherein the template document is shown on the screen after the manual input of fields, and fields in the template document are manually corrected.

9. A method for collection of data from documents present in machine-readable form, the method performed by a computer system with a processor and memory, the method comprising the steps of:
associating at least one already processed document stored as a template and designated as a template document with a document to be processed designated as a read document, where fields for data to be extracted are defined in the template document;
said associating occurring by a cost function with which a similarity between the read document and template documents is calculated and a template document with a best similarity is associated with the read document; and
automatically extracting data contained in the read document from regions that correspond to the fields in the template document, wherein automatically extracting data is performed by the processor executing instructions that are stored in the memory.

10. A computer system for collecting data from documents present in machine-readable form, the computer system having a processor and a memory, the memory containing computer readable instructions which, when executed by the processor, perform the following steps:
compare at least one already processed document that is stored as a template document and designated as template document with a document to be processed designated as a read document, fields for data to be extracted being defined in the template document;
determine a similarity between the read document and the template document using a cost function,
associate a template document having a best similarity with the read document; and
automatically extract data contained in the read document from regions that correspond to the fields in the template document.

11. A computer system according to claim 10 further comprising a scanner for acquisition of documents.

12. A method of transforming a template document using a read document, the method including:
associating a stored template document with a read document, wherein the stored template document includes at least one field, and wherein the read document includes data;
automatically extracting at least some of the data from the read document, wherein the extracted data is located in at least one region of the read document that correspond to the at least one field of the stored template document;
displaying the read document on a display screen;
receiving an input that associates a region of the read document with a chosen field; and
generating a template document, wherein:
the template document is a new template document and is transformed to incorporate the chosen field associated with the read document, or
the template document is the stored template document and is transformed to incorporate the chosen field associated with the read document.

13. The method according to claim 12 wherein generating the template document further includes:
verifying that the chosen field corresponds to a proper region of a previously processed read document, wherein the read document is stored as the new template document incorporating the chosen field if:
the chosen field does not correspond to the proper region of the previously processed read document, or
a field of the stored template document cannot be automatically corrected with the chosen field.

14. A method according to claim 12 wherein the chosen field is linked with a databank in which data automatically extracted from the read document are stored.

15. A method according to claim 14 wherein the chosen field is linked via input of the chosen field in the read document and selection of an element of the databank.

16. A method according to claim 12 further comprising evaluating a syntax or semantics of the chosen field when the input is received to associate the chosen field with the region of the read document, wherein the association is executed dependent on said evaluation.

17. A method according to claim 12 further comprising evaluating a plurality of read documents to determine whether surroundings in the plurality of read documents are constant with regard to at least one field in the stored template document, wherein this evaluation is considered in mapping a field of the template document to a region of a read document.

18. A method according to claim 17 wherein associating the stored template document with the read document includes executing a statistical evaluation associating a familiarity value with the at least one field in the stored template document, the familiarity value describing how well data of the read document corresponding to the at least one field could be read.

19. A method according to claim 12 wherein generating the template document includes displaying the stored template document on a display screen and receiving an input to incorporate the chosen field into the stored template document.

20. A method of generating a template document using a read document, the method performed by a computer system having a processor and memory, the method including:
  receiving a read document, wherein the read document is received from a scanner;
  comparing a stored template document with the read document, wherein the stored template document includes at least one field, wherein comparing the stored template document with the read document is performed by the processor executing instructions that are stored in the memory;
  displaying the read document on a display screen;
  receiving an input that associates a region of the read document with a chosen field; and
  incorporating the chosen field into the stored template document or creating a new template document with the read document.

* * * * *